US008500150B2

(12) United States Patent  
Cho (10) Patent No.: US 8,500,150 B2
(45) Date of Patent: Aug. 6, 2013

(54) TRANSPORT APPARATUS

(75) Inventor: Young-Shin Cho, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 204 days.

(21) Appl. No.: 12/929,286

(22) Filed: Jan. 12, 2011

(65) Prior Publication Data

US 2011/0278086 A1 Nov. 17, 2011

(30) Foreign Application Priority Data

May 13, 2010 (KR) ........................ 10-2010-0045045

(51) Int. Cl.
*B60H 1/24* (2006.01)
*H01M 10/50* (2006.01)

(52) U.S. Cl.
USPC ........... 280/212; 180/53.61; 280/216; 416/55

(58) Field of Classification Search
USPC ............. 280/212, 214, 216, 288.4; 180/53.6, 180/53.61, 53.8; 62/241, 242, 244; 416/55
See application file for complete search history.

(56) References Cited

U.S. PATENT DOCUMENTS

| | | | | |
|---|---|---|---|---|
| 681,565 A | * | 8/1901 | McClune et al. | 415/124 |
| 803,635 A | * | 11/1905 | Stahlhut | 416/55 |
| 1,387,352 A | * | 8/1921 | Clark | 222/621 |
| 2,059,457 A | * | 11/1936 | Horton | 60/397 |
| 2,488,021 A | * | 11/1949 | May | 310/75 C |
| 4,555,911 A | * | 12/1985 | Kusisto | 62/241 |
| 6,196,358 B1 | | 3/2001 | Nakamura | |
| 7,931,110 B2 | | 4/2011 | Nishiura et al. | |
| 2006/0078786 A1 | * | 4/2006 | Wu | 429/62 |
| 2006/0088758 A1 | * | 4/2006 | Wu | 429/97 |
| 2011/0015046 A1 | * | 1/2011 | Chen | 482/61 |

FOREIGN PATENT DOCUMENTS

| | | |
|---|---|---|
| JP | 07-040877 A | 2/1995 |
| JP | 2000-027903 A | 1/2000 |
| JP | 2001-203004 A | 7/2001 |
| JP | 2007-200580 A | 8/2007 |
| JP | 2010-083372 A | 4/2010 |
| KR | 20 1992-0006296 U | 4/1992 |
| KR | 10-0266468 B1 | 6/2000 |
| KR | 10 2003-0075060 A | 9/2003 |
| WO | WO 2010-004131 A2 | 1/2010 |

OTHER PUBLICATIONS

Korean Notice of Allowance in KR 10-2010-0045045, dated Sep. 17, 2012 (Cho).
Korean Office Action in KR 10-2010-0045045, dated Mar. 8, 2012 (Cho).
Korean Office Action in KR 10-2012-0047593, dated Jun. 16, 2012 (Cho).

* cited by examiner

*Primary Examiner* — Anne Marie M Boehler
(74) *Attorney, Agent, or Firm* — Lee & Morse, P.C.

(57) ABSTRACT

A transport apparatus including a rotary portion for providing a source of a rotary motion; a motion transfer portion for mechanically transferring a rotational force of the rotary portion; a battery pack; and a cooling portion for receiving the rotation force transferred from the motion transfer portion and cooling the battery pack by moving a fluid.

11 Claims, 7 Drawing Sheets

TRANSPORT APPARATUS

BACKGROUND

1. Field

Embodiments relate to a transport apparatus.

2. Description of the Related Art

Secondary batteries refer to rechargeable batteries that are widely used not only for portable electric devices, e.g., mobile phones, laptop computers, or camcorders, but also for electric driving apparatuses, e.g., electric bicycles, electric scooters, or electric vehicles. The secondary battery may have a structure in which an electrode assembly having a positive electrode, a negative electrode, and a separator rolled in a jelly roll structure is inserted in a case through an opening portion and the opening portion is covered by a cap plate. A current collection portion may be installed at an end portion of the electrode assembly to be electrically connected to an electrode terminal provided at the cap plate. Thus, when the electrode terminal of the cap plate is connected to an external terminal, current generated by the electrode assembly may be supplied to the external terminal via the current collection portion and the electrode terminal of the cap plate.

Recently, as interest in alternative energy grows, a method of applying the secondary battery to electric driving apparatuses, e.g., electric bicycles or electric vehicles has been widely developed. In a typical bicycle, two wheels are rotatably installed on a frame and a tire is installed on each wheel. Pedals for driving the wheels are installed on opposite sides of the frame so that a driving force generated by driving the pedals is transferred to the wheels via a chain. A handle may be directly controlled by a user. Also, a saddle is mounted on the frame so that the user may sit thereon. In the bicycle configured as described above, the user rotates the pedals by using feet so that the wheels are rotated via the chain. At the same time, by turning the handle, the user may control a direction in which the bicycle is moved.

However, when the bicycle is moved by rotating the pedals using only human power, a lot of energy would be necessary to ride a long distance or on an uphill road. In particular, for most people, there is a limit in riding beyond a certain distance. To overcome this limit, the wheels of a bicycle may be rotated by being driven by a motor using a secondary battery that is repeatedly rechargeable, which may replace or supplement human power to push pedals to rotate wheels. In this case, heat may be generated when charging and discharging the secondary battery, which may deteriorate stability and reliability of secondary the battery.

SUMMARY

Embodiments are directed to a transport apparatus, which represents advances over the related art.

It is a feature of an embodiment to provide a transport apparatus having a battery pack cooling apparatus for cooling a secondary battery.

At least one of the above and other features and advantages may be realized by providing a transport apparatus including a rotary portion for providing a source of a rotary motion; a motion transfer portion for mechanically transferring a rotational force of the rotary portion; a battery pack; and a cooling portion for receiving the rotation force transferred from the motion transfer portion and cooling the battery pack by moving a fluid.

The rotary portion may include a wheel.

The rotary portion may include a motor driven by the battery pack.

The rotary portion may include a pedal portion that receives a driving force provided by a user.

The motion transfer portion may be a converter of the rotary motion of the rotary portion into a linear motion.

The motion transfer portion may include a crankshaft mechanically connected to the rotary portion; and a rod having one end connected to the crankshaft and another end connected to the cooling portion.

The rotary portion may include a wheel having a rotation axis and spokes, and the motion transfer portion may include a rod having one end connected to one of the spokes and another end connected to the cooling portion.

The cooling portion may include a cylinder mechanically connected to the motion transfer portion, the cylinder being for moving the fluid toward one side of the cylinder; and a hose, the hose having one end connected to one side of the cylinder and another end connected to the battery pack, the hose being for directing the fluid toward the battery pack.

The battery pack may include an inlet and an outlet arranged and configured such that the fluid provided through the inlet of the battery pack via the hose is discharged through the outlet of the battery pack, and wherein the hose and the inlet of the battery pack are waterproof.

The battery pack may include an inlet and an outlet arranged and configured such that the fluid is provided through the inlet of the battery pack via the cooling portion and is discharged through the outlet of the battery pack.

The outlet of the battery pack may be open in one direction to direct the fluid provided via the cooling portion outside of the battery pack and closed in an opposite direction.

The battery pack may be configured to circulate the fluid within the battery pack.

The inlet and the outlet of the battery pack may be arranged in a portion of the battery pack corresponding to a side facing in the direction in which gravity is exerted on the battery pack.

At least one of the above and other features and advantages may also be realized by providing a transport apparatus including a rotary portion for providing a source of a rotary motion; a motion transfer portion for mechanically transferring a rotation force of the rotary portion; a battery pack; and a cooling portion for receiving the rotation force transferred from the motion transfer portion and cooling the battery pack by moving a fluid, wherein the motion transfer portion includes a sprocket mechanically connected to the rotary portion, and a power transfer unit having one end connected to the sprocket and another end connected to the cooling portion.

The power transfer unit may include a chain.

The cooling portion may include a fan connected to the power transfer unit.

The cooling portion may further include a hose having one end accommodating at least part of the fan and another end connected to the battery pack.

At least one of the above and other features and advantages may also be realized by providing a transport apparatus including a rotary portion for providing a source of a rotary motion; a motion transfer portion for mechanically transferring a rotation force of the rotary portion; a battery pack; and a cooling portion for receiving the rotation force transferred from the motion transfer portion and cooling the battery pack by moving a fluid, wherein the motion transfer portion includes gears, the gears being mechanically connected to the rotary portion.

The cooling portion may include a fan for receiving the rotation force from the gears.

The cooling portion may further include a hose, the hose having one end accommodating at least part of the fan and another end connected to the battery pack.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0045045, filed on May 13, 2010, in the Korean Intellectual Property Office, and entitled: "Means of Transport," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Like reference numerals refer to like elements throughout.

Figure 1:
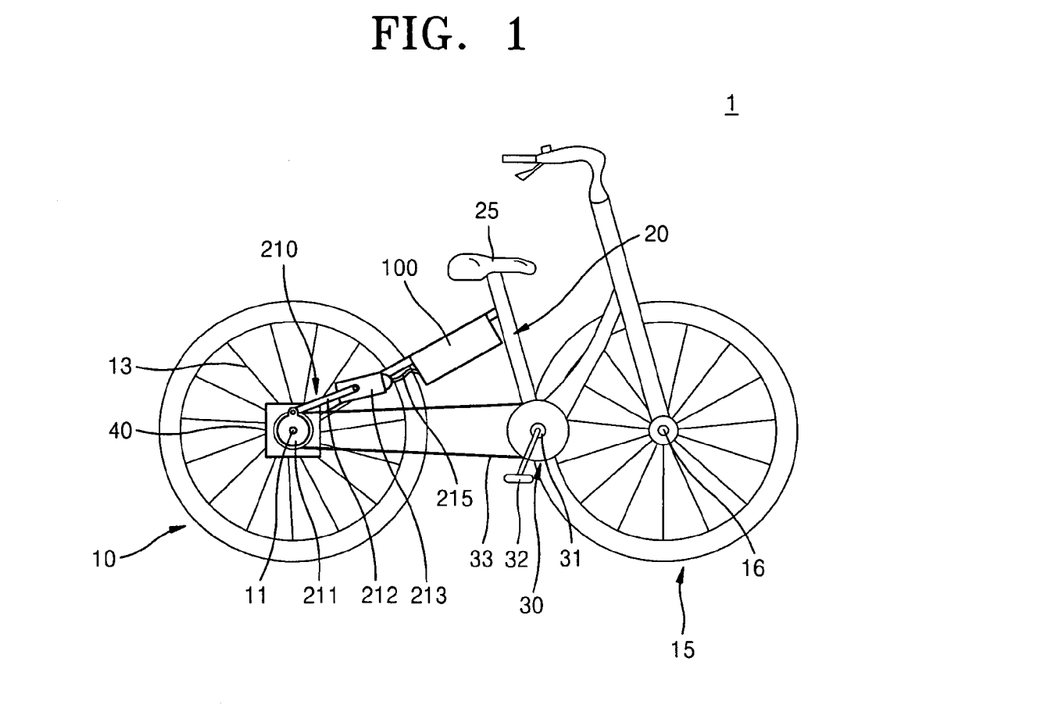
FIG. 1 illustrates a side view of a transport apparatus according to an embodiment.
Figure 2:
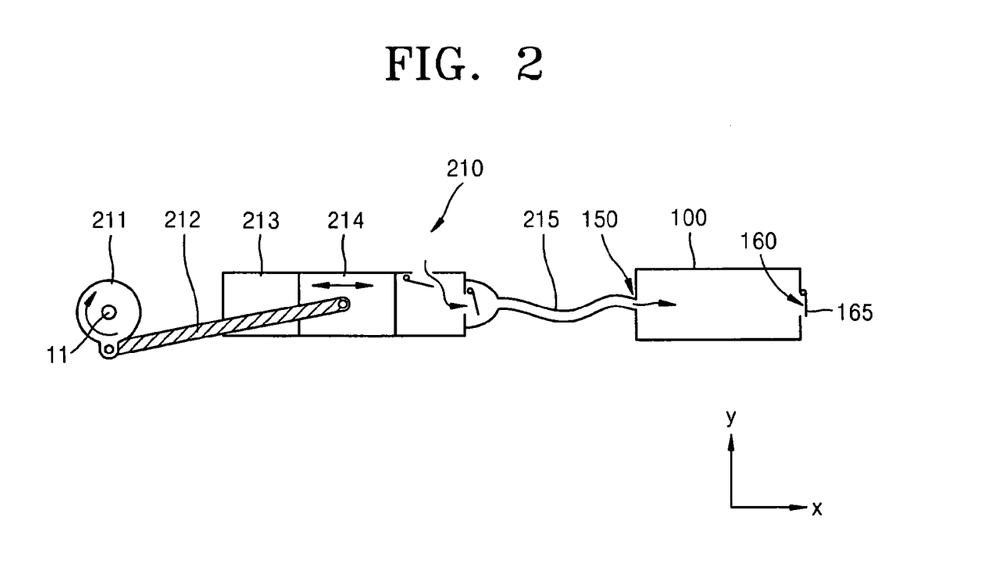
FIG. 2 illustrates a schematic conceptual diagram for explaining an operational principle of a first battery pack cooling apparatus and a battery pack in the transport apparatus of FIG. 1.
Figure 3:
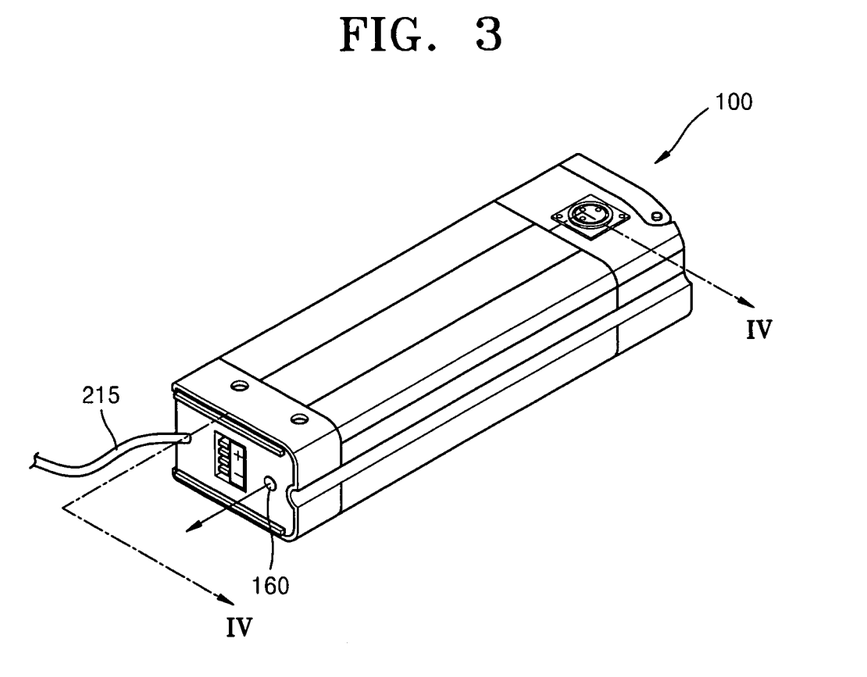
FIG. 3 illustrates a perspective view of the battery pack of FIG. 2.
Figure 4:
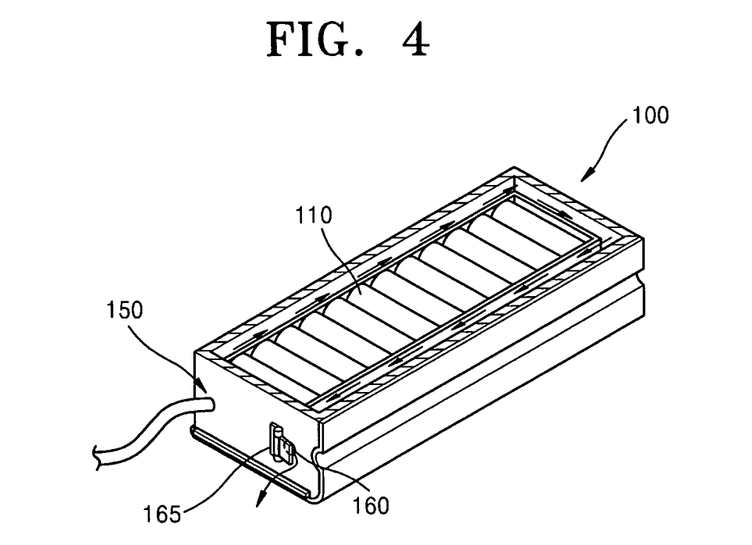
FIG. 4 illustrates a partial schematic perspective view of the battery pack of FIG. 3.

Referring to FIGS. 1-4, a transport apparatus according to an embodiment will be described. FIG. 1 illustrates a side view of a transport apparatus according to an embodiment. FIG. 2 illustrates a schematic conceptual diagram for explaining an operational principle of a first battery pack cooling apparatus 210 and a battery pack 100 in the transport apparatus of FIG. 1. FIG. 3 illustrates a perspective view of the battery pack 100. FIG. 4 illustrates a partial schematic perspective view of the battery pack 100 of FIG. 3.

Referring to FIG. 1, the transport apparatus may include, e.g., an electric bicycle 1. The electric bicycle 1 may include a first wheel 10, a second wheel 15, a body 20, a pedal portion 30, a motor 40, the battery pack 100, and the first battery pack cooling apparatus 210.

When a pedal 32 of the pedal portion 30 is rotated around a pedal axis 31 by driving power provided by a user, the first wheel 10 may rotate around a first wheel axis 11. The pedal portion 30 and the first wheel axis 11 may be connected via a first chain 33. The driving power for the first wheel 10 is not limited to rotation force of the pedal 32 provided by the user. For example, the first wheel 10 may be rotated by the motor 40. Although in FIG. 1 the motor 40 is arranged on the first wheel axis 11, the position of the motor 40 is not limited thereto. For example, the motor 40 may be arranged on the pedal axis 31 of the pedal portion 30 or on a second wheel axis 16 of the second wheel 15. Also, the motor 40 may be arranged on the body 20 to transfer driving power to the first wheel 10 or the second wheel 15 by a mechanical connector, e.g., a gear or a chain.

A saddle 25 may be arranged on the body 20. Also, the battery pack 100 may be arranged on the body 20. The battery pack 100 may accommodate a plurality of secondary batteries 110 as illustrated in FIG. 4. The battery pack 100 may be electrically connected to the motor 40 to supply electric energy. Each time the battery pack 100 performs charging or discharging, heat may be generated. Since overheating of the battery pack 100 may cause various malfunctions, it may be desirable to maintain the battery pack 100 at a constant or sufficiently low temperature. Accordingly, the first battery pack cooling apparatus 210 may be connected to the battery pack 100. An operational principle of the first battery pack cooling apparatus 210 is described below with reference to FIG. 2.

The first battery pack cooling apparatus 210 may cool the battery pack 100 by moving a fluid using, e.g., rotary motion, generated during operation of the transport apparatus. The first battery pack cooling apparatus 210 may include a rotary portion, a motion transfer portion, the battery pack 100, and a cooling portion. The rotary portion may be rotated when a rotation force is applied thereon and may be, e.g., the first wheel 10 of FIG. 1. As the first wheel 10 rotates, the first wheel axis 11 of the first wheel 10 is rotated. The rotary portion is not limited thereto; and a variety of constituent elements may work as the rotary portion. For example, the pedal portion 30, the motor 40, or the second wheel 15 may be the rotary portion. That is, the pedal portion 30, which rotates by receiving a driving force provided by a user, the motor 40, which rotates when driven by electric energy, or either of the first and second wheels 10 and 15, which may rotate due to the pedal portion 30 or the motor 40, may constitute the rotary portion. Accordingly, the battery pack 100 may be cooled using the rotation of the rotary portion.

The motion transfer portion may mechanically transfer a rotation force applied to the rotary portion. Referring to FIG. 2, the motion transfer portion may convert rotary motion of the rotary portion due to the applied rotation force into a linear motion. For example, the motion transfer portion may include a crankshaft 211 mechanically connected to the first wheel axis 11 and a first rod 212 having one end connected to the crankshaft 211. As the crankshaft 211 rotates, the other end of the first rod 212 may linearly reciprocate.

The rotary portion may be the first wheel 10, which may include the first wheel axis 11 and spokes 13. The motion transfer portion may include a second rod having one end linked to one of the spokes 13, for example. That is, as the first wheel 10 rotates, the rotary motion of the first wheel 10 may be converted into a reciprocal linear motion by the second rod linked to the one spoke 13.

The cooling portion may receive driving power from the motion transfer portion and may cool the battery pack 100 by moving a fluid. The cooling portion may include, e.g., a cylinder and a first hose 215. The cylinder may include a cylinder housing 213 and a piston 214. The cylinder may be mechanically connected to the motion transfer portion and may move a fluid, e.g., ambient air, toward one side of the cylinder. That is, as illustrated in FIG. 2, due to the reciprocal linear motion of the other end of the first rod 212, the piston 214 may suck air into the cylinder housing 213 and then move the air toward one side of the cylinder housing 213 in a direction along an X axis. The air may then be transferred through the first hose 215 onto the battery pack 100 and thus the battery pack 100 may be cooled.

The battery pack 100 may include an inlet 150 and an outlet 160. Air may be taken in through the inlet 150 and exhausted out through the outlet 160. In the battery pack 100, the inlet 150 and the outlet 160 may be arranged in any of various ways. For example, as shown in FIG. 2, the inlet 150 may be formed at one side of the battery pack 100 and the outlet 160 may be formed at an opposite side thereof.

To make the battery pack 100 waterproof, the inlet 150 may be connected and sealed to the first hose 215; and the outlet 160 may include, e.g., an outlet cover 165. The outlet cover 165 may be open in a direction in which the fluid is exhausted out of the battery pack 100 and closed in an opposite direction so that intrusion of external moisture or foreign materials may be prevented. The outlet 160 may be a one-way valve to allow for exhaustion of fluid in one direction while preventing infiltration of fluid or other foreign materials. In an implementation, as shown in FIG. 3, both of the inlet 150 and the outlet 160 may be formed at one side of the battery pack 100. The inlet 150 and the outlet 160 may be arranged in a gravity direction of the battery pack 100, i.e., on a lower side of the battery pack 100. As such, moisture and foreign materials, e.g., rain falling from above the battery pack 100 may be prevented from intruding into the battery pack 100. In this case, the inlet 150 and the outlet 160 may be arranged in the same direction, i.e., on the same side of the battery pack 100. Referring to FIGS. 3 and 4, in order for the fluid to be taken into the battery pack 100 through the first hose 215 to circulate inside the battery pack 100 and in order for the fluid to be exhausted through the outlet 160, a structure of an interior of the battery pack 100 may be formed as shown in FIG. 4. In particular, the interior of the battery pack may have a structure including a cooling path for the cooling fluid to flow through and cool the battery cells 110. However, the structure of the battery pack 100 of FIG. 4 is merely one of various examples. The embodiments are not limited thereto; and may be modified in any of various ways.

Figure 5:
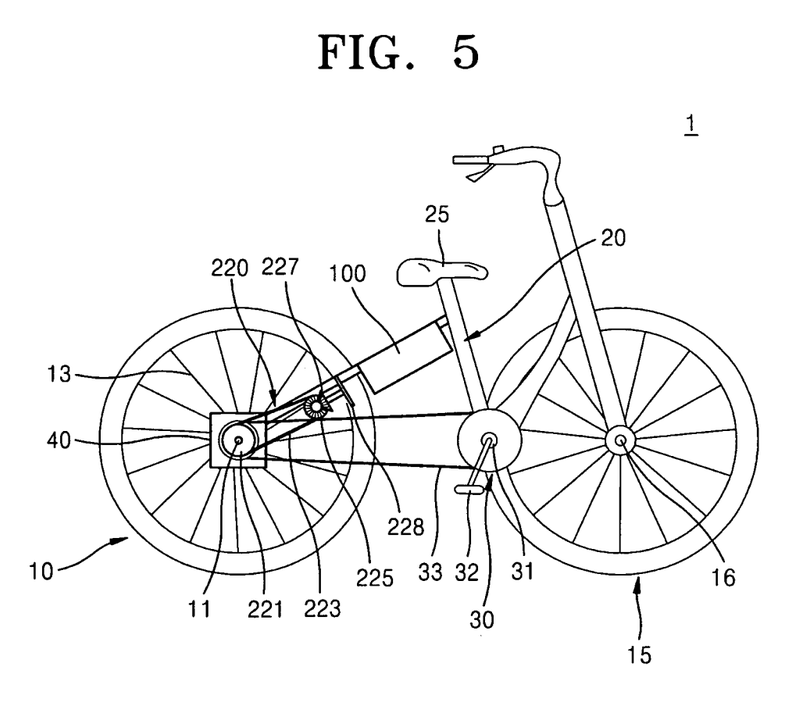
FIG. 5 illustrates a schematic side view of a transport apparatus according to another embodiment.
Figure 6:
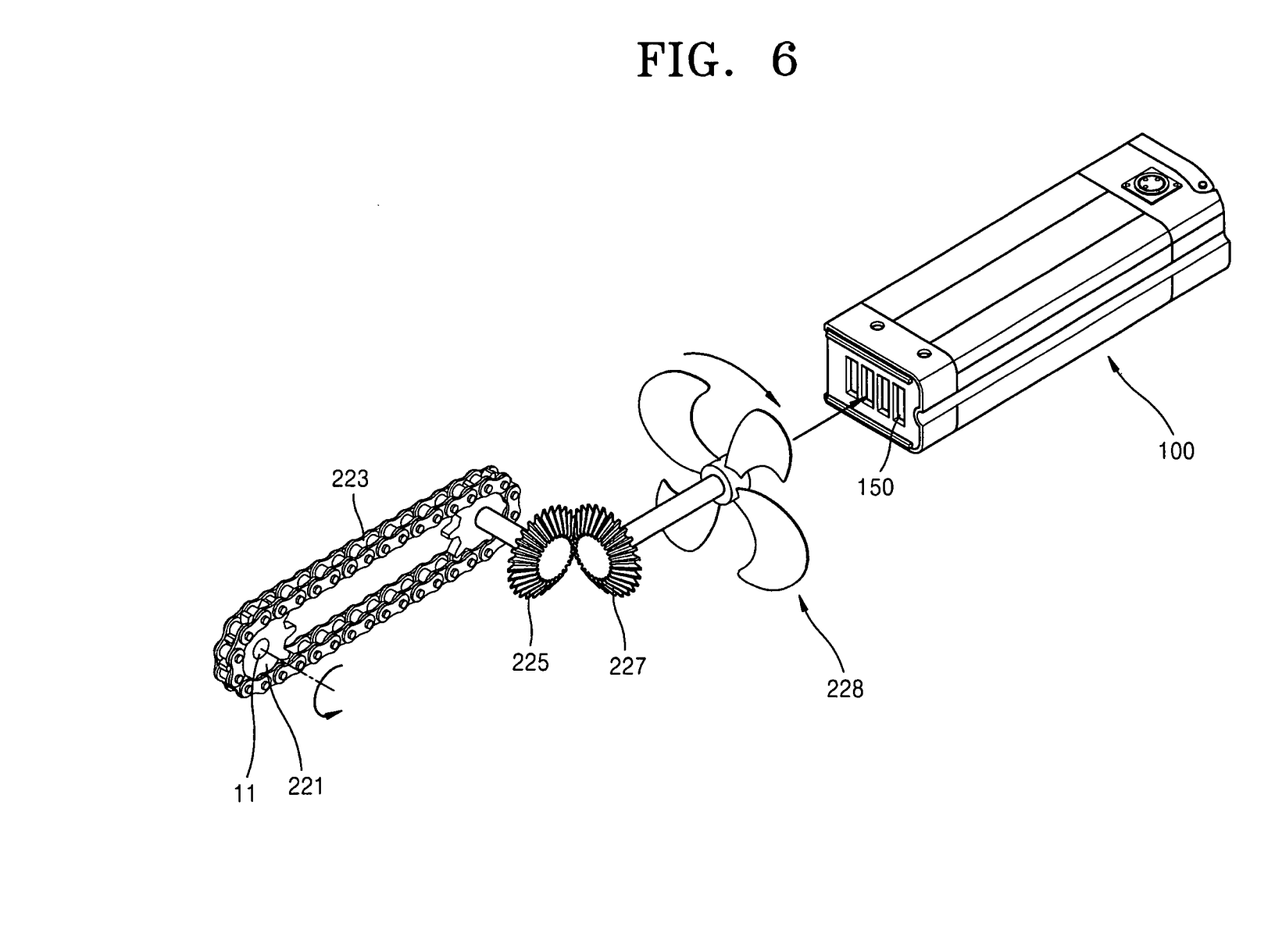
FIG. 6 illustrates schematic perspective view of a second battery pack cooling apparatus and a battery pack in the transport apparatus of FIG. 5.
Figure 7:
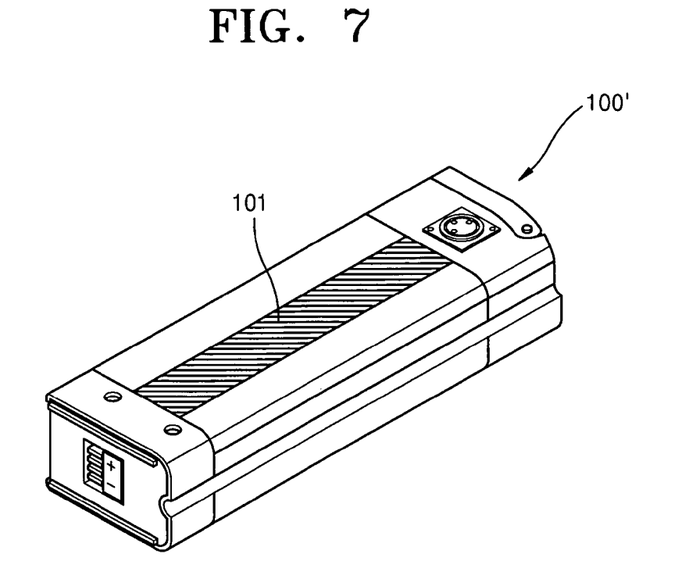
FIG. 7 illustrates a schematic perspective view of a battery pack with heat dissipation fins.
Figure 8:
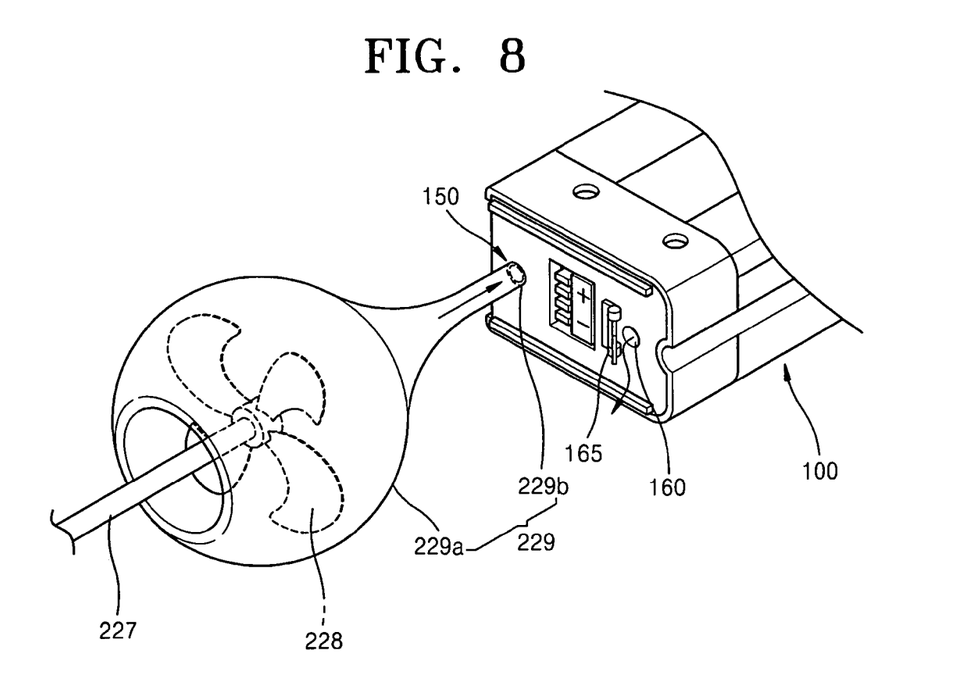
FIG. 8 illustrates a modified example of the second battery pack cooling apparatus and battery pack of FIG. 6 including a hose.

Referring to FIGS. 5-8, a second battery pack cooling apparatus 220 according to another embodiment will be described. FIG. 5 illustrates a schematic side view of a transport apparatus according to another embodiment. FIG. 6 illustrates schematic perspective view of the second battery pack cooling apparatus 220 and the battery pack 100 in the transport apparatus of FIG. 5. FIG. 7 illustrates a schematic perspective view of a battery pack 100' with heat dissipation fins 101. FIG. 8 illustrates a modified example of the battery pack cooling apparatus and battery pack of FIG. 6 including a second hose 229.

Referring to FIGS. 5 and 6, the second battery pack cooling apparatus 220 according to the present embodiment will be described. The transport apparatus may be, e.g., an electric bicycle 1. The same reference numerals as those in the above-described embodiment shown in FIGS. 1 and 2 may have the same structures and/or functions. FIGS. 5 and 6 illustrate modified embodiments relative to the embodiments of FIGS. 1 and 2 in terms of the motion transfer portion and the cooling portion. The rotary portion may be the first and second wheels 10 and 15, the pedal portion 30, or the motor 40, as described above. The motion transfer portion may include a sprocket 221, a first power transfer unit, and a fan 228.

The sprocket 221 may be mechanically connected to the rotary portion. Although the sprocket 221 is connected to the first wheel axis 11 in FIG. 6, the embodiments are not limited thereto. For example, the sprocket 221 may be mechanically connected to the second wheel axis 16, the pedal axis 31, or the motor 40.

The first power transfer unit may be a chin 223. The chain 223 may be connected to the sprocket 221 to transfer a rotation force of the sprocket 221 to the fan 228. The rotation force transferred via the chain 223 may rotate the fan 228. To rotate the fan 228 by means of the chain 223, a variety of mechanical couplings may be used. For example, as shown in FIG. 6, a first gear 225 and a second gear 227 may connect the chain 223 and the fan 228. In the present embodiment, the chain 223 is described as an example, and thus the embodiments are not limited thereto; and a variety of power transfer units may be used therefor. For example, a belt may be used instead of the chain 223.

The chain 223 and the fan 228 may be coupled using any of various methods. The chain 223 may also be directly connected to the fan 228. Fluid flow generated by the fan 228 may be used to cool the battery pack 100. The battery pack 100 may include the inlet 150 and the outlet 160. The inlet 150 may be in the form of a through hole. As the fluid, e.g., external air, is moved by the fan 228, the fluid may pass through the inlet 150 to cool the secondary batteries 110 of the battery pack 100. Since the air moved by the fan 228 may pass over a surface of the battery pack 100 while passing through the inlet 150 and the outlet 160, the heat radiation fins 101 may be formed on the surface of the battery pack 100 to improve a cooling effect. The heat radiation fins 101 may be formed of, e.g., aluminum. A method of cooling the battery pack 100 using the flow of air generated by the fan 228 is not limited thereto. For example, referring to FIG. 8, the second battery pack cooling apparatus 220 may further include a hose 229 having one end 229a accommodating at least part of the fan 228 and another end 229b connected to the inlet 150 of the battery pack 100. Thus, the flow of a fluid, e.g., air, generated by the rotation of the fan 228 may be taken into the battery pack 100 through the hose 229 so that heated secondary batteries 110 may be cooled. The shape of the fan 228 or the hose 229 of FIG. 8 is merely an example and may be diversely modified by those skilled in the art.

Figure 9:
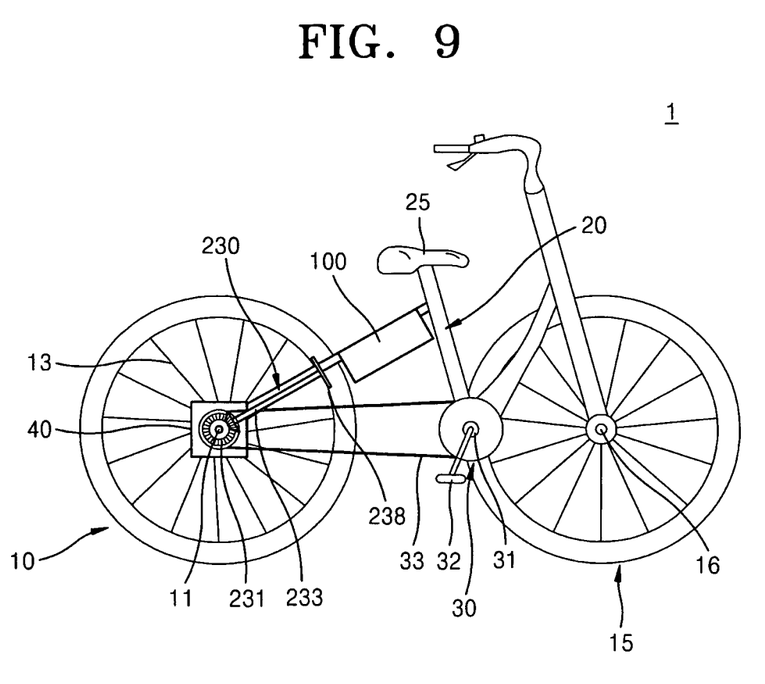
FIG. 9 illustrates a schematic side view of a transport apparatus according to yet another embodiment.
Figure 10:
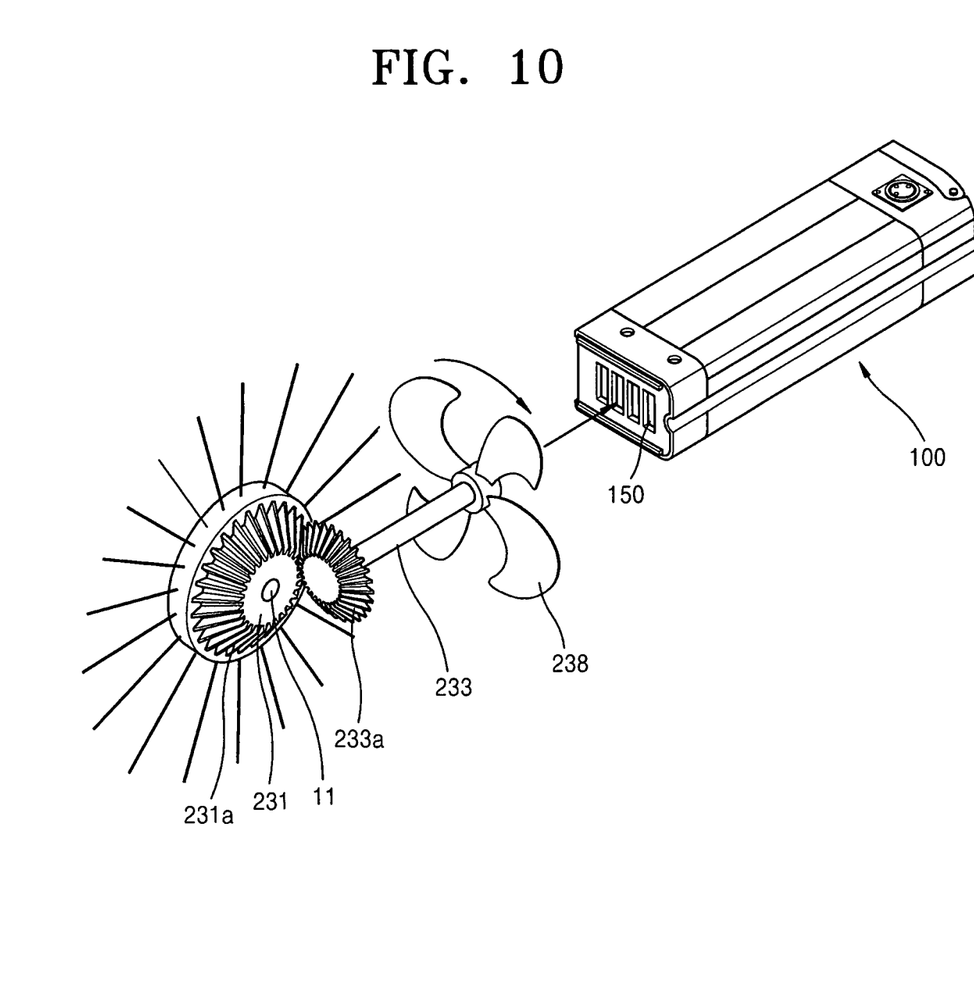
FIG. 10 illustrates schematic perspective view of a battery pack cooling apparatus and a battery pack in the transport apparatus of FIG. 9.

The structure of the motion transfer portion or the cooling portion may be modified in various ways. Referring to FIGS. 9 and 10, a transport apparatus according to yet another embodiment will be described. FIG. 9 illustrates a schematic side view of a transport apparatus according to yet another embodiment. FIG. 10 illustrates a schematic perspective view of a third battery pack cooling apparatus 230 and the battery pack 100 in the transport apparatus of FIG. 9.

In the third battery pack cooling apparatus 230 shown in FIGS. 9 and 10, as a modified example of the embodiment of FIGS. 5 and 6, the motion transfer portion may include gears mechanically connected to the rotary portion. For example, in FIG. 10, the motion transfer portion may include a third gear 231 and a fourth gear 233. Also, the cooling portion may include a fan 238. For example, the third gear 231 and the fourth gear 233 may be formed of bevel gears. Thus, as the rotary portion rotates, the fan 238 may be rotated through engagement of gears. Although not illustrated, a hose may be provided to accommodate at least part of the second fan 238. That is, the hose may be configured to have the same structure and/or function as that of the hose 229 of FIG. 8. The battery pack 100 may have a through hole and/or the inlet 150 connected to the hose may be formed on the battery pack 100.

As described above, according to the one or more of the above embodiments, since a transport apparatus having a secondary battery provides an apparatus for cooling the secondary battery, an efficiency of the secondary battery may be improved. The embodiments may be used for industries using or manufacturing a transport apparatus.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A transport apparatus, comprising:
a rotary portion for providing a source of a rotary motion;
a motion transfer portion for mechanically transferring a rotational force of the rotary portion;
a battery pack; and
a cooling portion for receiving the rotation force transferred from the motion transfer portion and cooling the battery pack by moving a fluid,
wherein:
the battery pack includes an inlet and an outlet arranged and configured such that the fluid is provided through the inlet of the battery pack via the cooling portion and is discharged through the outlet of the battery pack, and
the outlet of the battery pack is open in one direction to direct the fluid provided via the cooling portion outside of the battery pack and closed in an opposite direction.

2. The transport apparatus as claimed in claim 1, wherein the rotary portion includes a wheel.

3. The transport apparatus as claimed in claim 1, wherein the rotary portion includes a motor driven by the battery pack.

4. The transport apparatus as claimed in claim 1, wherein the rotary portion includes a pedal portion that receives a driving force provided by a user.

5. The transport apparatus as claimed in claim 1, wherein the motion transfer portion is a converter of the rotary motion of the rotary portion into a linear motion.

6. The transport apparatus as claimed in claim 5, wherein the motion transfer portion includes:
a crankshaft mechanically connected to the rotary portion; and
a rod having one end connected to the crankshaft and another end connected to the cooling portion.

7. The transport apparatus as claimed in claim 5, wherein:
the rotary portion includes a wheel having a rotation axis and spokes, and
the motion transfer portion includes a rod having one end connected to one of the spokes and another end connected to the cooling portion.

8. The transport apparatus as claimed in claim 5, wherein the cooling portion includes:
a cylinder mechanically connected to the motion transfer portion, the cylinder being for moving the fluid toward one side of the cylinder; and
a hose, the hose having one end connected to one side of the cylinder and another end connected to the battery pack, the hose being for directing the fluid toward the battery pack.

9. The transport apparatus as claimed in claim 8, wherein the battery pack includes an inlet and an outlet arranged and configured such that the fluid provided through the inlet of the battery pack via the hose is discharged through the outlet of the battery pack, and wherein the hose and the inlet of the battery pack are waterproof.

10. The transport apparatus as claimed in claim 1, wherein the battery pack is configured to circulate the fluid within the battery pack.

11. The transport apparatus as claimed in claim 1, wherein the inlet and the outlet of the battery pack are arranged in a portion of the battery pack corresponding to a side facing in the direction in which gravity is exerted on the battery pack.

* * * * *